UNITED STATES PATENT OFFICE.

HUMBERT CANTONI, OF VOGHERA, ITALY, AND JEAN CHAUTEMS AND EMILE DEGRANGE, OF GENEVA, SWITZERLAND, ASSIGNORS TO THE FIRM OF CANTONI CHAUTEMS ET COMPAGNIE AND EMILE DEGRANGE, OF GENEVA, SWITZERLAND.

MANUFACTURE OF CREAM OF TARTAR.

1,103,658.

Specification of Letters Patent. Patented July 14, 1914.

No Drawing.

Application filed February 8, 1912. Serial No. 676,449.

*To all whom it may concern:*

Be it known that we, HUMBERT CANTONI, a subject of the King of Italy, and JEAN CHAUTEMS and EMILE DEGRANGE, citizens of Switzerland, residing, respectively, at Voghera, Italy, and Geneva, in the Confederation of Switzerland, have invented certain new and useful Improvements in the Manufacture of Cream of Tartar, of which the following is a specification.

The present invention relates to a process for extracting and recovering in the form of potassium bitartrate (cream of tartar) the whole of the tartaric acid which is contained in the lees of wine, crude tartar or argol, still crystals, residues of the distillation of wine, calcium tartrate or any other tartaric material whatsoever.

The processes known heretofore, according to which the cream of tartar is obtained by precipitation, all possess the defect or disadvantage that the employment of large quantities of dissolving and precipitating agents is necessary. In these processes the raw materials are attacked either by means of an acid and the potassium bitartrate is precipitated from the solution obtained by means of an alkaline reagent or the raw material is treated with an alkaline agent, whereafter the potassium bitartrate is precipitated from its solution by means of an acid. In both the cases the precipitation takes place in the presence of a suitable quantity of a potassium salt. In the first case it is possible to operate in the cold, while in the second case heat has to be employed, in order to decompose completely the raw material, when the same contains calcium tartrate. It has now been shown that an important saving of combustible matter and especially of reagents may be obtained by treating the raw material, instead of either only with an acid or alkaline agent, in a suitable manner with the two agents by operating either successively upon a single portion of the material, or separately or separately and successively upon several portions of the raw materials, in order that the alkaline agent converts the potassium bitartrate, which is contained in the raw material, wholly or according to the composition of the raw material and the operative method employed, only partly into a normal tartrate, for instance, Seignette's salt, which is more soluble than cream of tartar, this salt being dissolved, and that the acid agent dissolves the calcium tartrate, when such is present, which generally is the case, and according to the method employed the whole of the cream of tartar or only the rest of the same which eventually has not been transformed by the alkaline agent, by forming free tartaric acid and the potassium and calcium-salts of the acid employed. In this manner two solutions, one an alkaline and the other an acid, are obtained, which are mixed together after the calculated amount of a potassium-salt has been added to the alkaline solution and the calculated amount of oxalic acid to the acid solution, in order to convert on the one hand the whole free tartaric acid which was originally contained as calcium tartrate in the raw material, into potassium bitartrate, and on the other hand the whole of the calcium contained in the acid solution into insoluble calcium oxalate. By mixing and stirring the two solutions together the whole tartaric acid contained in the raw material precipitates in form of potassium bitartrate mixed with calcium oxalate and is separated from the latter by means of boiling water to which a little oxalic acid has been added, whereafter the solution is decolorized and the cream of tartar crystallized. Such a process forms the subject of the present invention. The advantage which it offers as compared with the known process is easily shown from the following comparison of the different processes in which, because of the simplicity, it is supposed that the raw materials do not contain any calcium tartrate.

*A. Treatment of the raw material with an acid agent and precipitation of cream of tartar from the acid solution by means of an alkaline reagent.*

1. *Solution*—

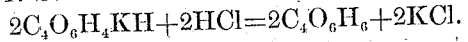

2. *Precipitation of cream of tartar*—

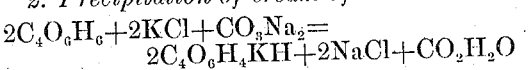

that is to say: by using two molecules HCl and one molecule $CO_3Na_2$ one obtains two molecules cream of tartar.

B. *Treatment of the raw materials with an alkaline agent and precipitation of the cream of tartar from the alkaline solution by means of an acid.*

1. Solution—

$$2C_4O_6H_4KH + CO_3Na_2 = 2C_4O_6H_4KNa + CO_2 + H_2O$$

2. Precipitation of cream of tartar—

$$2C_4O_6H_4KNa + 2HCl = 2C_4O_6H_4KH + 2NaCl$$

that is to say one obtains by employing one molecule $CO_3Na_2$ and two molecules HCl again two molecules cream of tartar.

C. *Treatment of the raw materials according to the present invention with an alkaline and an acid reagent and precipitation of cream of tartar by mixing together the obtained alkaline and acid solutions.*

1. Solution in two phases—

(a) $2C_4O_6H_4KH + CO_3Na_2 = 2C_4O_6H_4KNa + CO_2 + H_2O$ (b) $2C_4O_6H_4KH + 2HCl = 2C_4O_6H_6 + 2KCl$

2. Precipitation of cream of tartar—

$$2C_4O_6H_4KNa + 2C_4O_6H_6 + 2KCl = 4C_4O_6H_4KH + 2NaCl,$$

that is to say one obtains by the employment of one molecule $CO_3Na_2$ and two molecules HCl four molecules cream of tartar.

When the raw materials contain calcium tartrate, which is generally the case, the reactions pass in a similar manner after addition of oxalic acid to the acid and a potassium salt, for instance potassium chlorid, to the alkaline solution:

1. Solution in two phases and wholly in the cold—

(a) $6C_4O_6H_4KH + 3CO_3Na_2 = 6C_4O_6H_4KNa + 3CO_2 + 3H_2O$ (b) $2C_4O_6H_4Ca + 4HCl = 2C_4O_6H_6 + 2CaCl_2.$

Here it is to be observed that each tartrate is treated with the most suitable dissolvent namely the postassium bitartrate, with carbonate of sodium and the calcium tartrate with hydrochloric acid.

2. Precipitation after addition of potassium chlorid to the alkaline and oxalic acid to the acid solution—

$$2CaCl_2 + 2C_2O_4H_2 = 2C_2O_4Ca + 4HCl$$
$$6C_4O_6H_4KNa + 2C_4O_6H_6 + 4HCl + 2KCl = 8C_4O_6H_4KH + 6NaCl.$$

These two reactions take place simultaneously and are represented by separate equations for the sake of clearness.

With a smaller proportion of calcium tartrate one would for example have:

1. Solution in two phases wholly in the cold—

(a) $24C_4O_6H_4KH + 4C_4O_6H_4Ca + 9CO_3Na_2 = 18C_4O_6H_4KNa + 9CO_2 + 9H_2O + 4C_4O_6H_4Ca + 6C_4O_6H_4KH$ have not been attacked by the carbonate of sodium.

(b) $4C_4O_6H_4Ca + 6C_4O_6H_4KH + 14HCl = 10C_4O_6H_6 + 4CaCl_2 + 6KCl.$

2. Precipitation.—One has simultaneously:

$$4CaCl_2 + 4C_2O_4H_2 = 4C_2O_4Ca + 8HCl$$

$18C_4O_6H_4KNa + 10C_4O_6H_6 + 8HCl + 6KCl$ (coming from the raw material) $+ 4KCl$ (which has been added) $= 28C_4O_6H_4KH + 18NaCl.$ Owing to the combined treatment of the raw materials with alkaline and acid agents and to the following mixing of the obtained solutions there results the advantage that, even when exactly the same proportions of reagents are employed for the attack of the raw materials, by the same total employment of reagents one dissolves twice as much tartaric compounds as compared with the processes hitherto known. Therefore the double amount of cream of tartar can be obtained. In this manner the working-expenses are reduced in a large proportion and an economy of 50% of reagents is obtained. Since all the reactions can be carried out wholly in the cold, there is as a result the economy of fuel.

It is well known by us that bioxalate of potassium is employed for refining cream of tartar. Heretofore it has also been the practice to employ oxalic acid or oxalates and potassium salts in connection with the production of cream of tartar from crude materials containing calcium tartrate. However, according to this practice the crude material was directly subjected to the action of hot water to which oxalic acid or oxalates were added in quantity about equivalent to the calcium tartrate present and the mixture boiled in presence of a sufficient quantity of potassium chlorid or other potassium salt for converting the calcium tartrate into bitartrate of potassium and calcium oxalate. As a result, a considerable quantity of boiling water and relatively much time are required. The calcium oxalate obtained remains in the residues. In contradistinction thereto, the oxalic acid and the potassium salt are, according to the present invention, only employed, after the acid and alkaline solutions are prepared and they are added to the respective solutions in the cold and in such quantities, that on the one hand the Ca which is contained in the acid solution as $CaCl_2$ is precipitated in the form of calcium oxalate and on the other hand the free tartaric acid of the acid solution which originally existed as calcium-tartrate, is precipitated together with the tartaric acid which existed originally as potassium bitartrate, in the form of cream of tartar.

The separation of the calcium-oxalate from the cream of tartar by means of boiling water, and also the regeneration of the oxalic acid from the calcium oxalate present no difficulties whatsoever. For the present process the alkaline reagents which are employed may advantageously consist of aqueous solutions of carbonate of sodium or potassium, ammonia and the like. As acid reagents, diluted acids such as for example hydrochloric acid, sulfuric acid and the like, may be employed. These reagents are advantageously refined before their employment, in order that they shall not contain any noxious matters such as for example lead, arsenic, iron, etc., which would spoil the cream of tartar.

This process may be illustrated by the following as

Example No. 1.

100 kg. lees of wine containing 25% tartaric acid, 22% of which being in form of potassium bitartrate and 3% in form of calcium tartrate, are divided after being crushed and torrefied, in tanks arranged one above the other in cascade fashion and treated in the cold with an aqueous solution of 8 kg. sodium carbonate of 97–98% which is poured by small portions into the highest tank. The reaction being finished in this tank, the liquid is caused to flow successively into the lower tanks. The residue is washed at first with the last alkaline washing-liquor of a preceding treatment of tartaric material and at last with pure water. Thereafter the residue resulting from the treatment of the raw material with the solution of sodium carbonate is treated in a similar manner as above mentioned and also in the cold with 31 liters of hydrochloric acid of 9 degrees Baumé. The insoluble residue is also treated at first with the last acid washing liquors of a preceding treatment and finally with pure water. The two first alkaline and acid washing liquors are added respectively to the alkaline and the acid main solution. Then 3 kg. oxalic acid are added to the acid and 1.7 to 1.8 kg. potassium chlorid to the alkaline solution. These two solutions are now mixed together under continuous stirring, whereby potassium bitartrate and calcium-oxalate precipitate. The solution is decanted and portions thereof mixed respectively with sodium carbonate and hydrochloric acid, so that said solution can be reëmployed for the treatment of crude material. The remaining portion of this solution may be also employed for the first washing of the residue of the following attack of crude material. The precipitate consisting of cream of tartar and calcium oxalate after having been centrifugally separated from the solution, is at first washed with cold water and then treated with about 600 liters of boiling water, to which 300 grams oxalic acid have been added, in order to extract the cream of tartar. The calcium oxalate remains in a solid state and the solution of cream of tartar is decanted from the calcium-oxalate, decolorized by means of animal-charcoal or another decolorizing reagent and filtered while still hot. The cream of tartar crystalizes out of the filtered solution. The crystals obtained are of the maximum purity and contain as shown by analysis from between 99.7 to 100% potassium bitartrate. The calcium oxalate which remains in a solid state is employed for regenerating the oxalic acid. The same cycle of operations can also be realized and the same chemical and economical results can be obtained by treating two exactly calculated quantities of the same crude material or of two different crude materials independently of each other until there is obtained complete extraction of the one quantity with one or more alkaline agents in the cold or the heat and of the other with one or more acid agents in the cold. The quantities of the reagents and of the crude materials employed are calculated in such a manner that by mixing the two alkaline and acid solutions the same chemical and economical result is obtained as that obtained by operating in the above described first manner. The chemical reactions which take place in this case may be represented by the following equations:

*1. Treatment of one portion of the crude material with an acid reagent—*

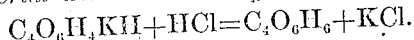
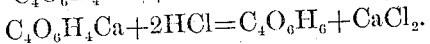

*2. Treatment of the other portion of the crude material with an alkaline reagent—*

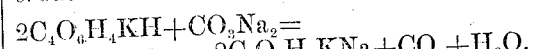
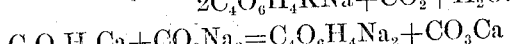

in the presence of heat or in the cold, depending upon whether or not any calcium tartrate is present.

*Precipitation of cream of tartar and calcium oxalate by mixing the two solutions after addition of KCl to the alkaline and oxalic acid to the acid solution—*

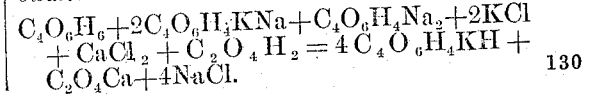

This method of the process is advantageously employed in the case where crude materials containing no calcium-tartrate and materials which, on the contrary, are very rich in calcium tartrate, have to be treated simultaneously. This case may be illustrated by the following as:

*Example No. 2.*

On the one hand 90 kilograms crude tartar containing 86% potassium bitartrate are treated with an aqueous solution of 29 kg. carbonate of sodium of 97–98% and on the other hand 100 kg. lees of wine containing 26% tartaric acid, 18% of which being in form of calcium tartrate and 8% in form of potassium bitartrate, are treated with 104 liters hydrochloric acid of 9 degrees Baumé. The alkaline solution obtained is added with about 10.75 to 11 kg. potassium chlorid and the acid solution with about 18 kg. oxalic acid, whereafter the two solutions are mixed together under stirring and produce a precipitate consisting of cream of tartar and calcium oxalate. This precipitate is treated in the same manner as in the first method cited.

We claim as our invention:

1. The herein described process for extracting and recovering in the form of potassium bitartrate all the tartaric acid contained in tartaric materials, consisting in treating raw tartaric materials by means of alkaline and acid agents to obtain a solution of a normal tartrate, and a solution of free tartaric acid, and then mixing the said solutions together to precipitate as cream of tartar all the tartaric acid contained therein.

2. The herein described process for extracting and recovering in the form of cream of tartar all of the tartaric acid contained in tartaric materials, consisting in treating a portion of the crude materials with alkaline reagents to obtain a solution of a normal tartrate, treating another portion of the crude materials with acid reagents to obtain a solution of free tartaric acid, and then mixing the two solutions together to precipitate as cream of tartar the whole tartaric acid contained therein.

3. The herein described process for extracting and recovering in the form of cream of tartar all of the tartaric acid contained in tartaric materials, consisting in treating a portion of the crude material in the presence of heat with an alkaline reagent to obtain a solution of a normal tartrate, treating another portion of the crude material with acid reagents to obtain a solution of free tartaric acid, and then mixing the two solutions together to precipitate as cream of tartar all the tartaric acid contained therein.

4. The herein described process of extracting and recovering in the form of potassium bitartrate all the tartaric acid contained in tartaric materials consisting in treating raw tartaric materials by means of alkline and acid agents to obtain a solution of normal tartrate and a solution of free tartaric acid, adding a potassium salt to the alkaline solution, adding oxalic acid to the acid solution, and then mixing the said solutions together to precipitate as cream of tartar all the tartaric acid contained therein.

5. The herein described process of extracting and recovering in the form of potassium bitartrate all of the tartaric acid contained in tartaric materials, consisting in first treating a portion of the crude materials with alkaline reagents to obtain the solution of normal tartrate, adding a potassium salt to this alkaline solution, then treating another portion of the crude materials with acid reagents to obtain a solution of free tartaric acid, adding a predetermined quantity of oxalic acid to this acid solution, and then mixing the two solutions together to precipitate as cream of tartar all the tartaric acid contained therein.

In testimony whereof we have affixed our signatures in presence of two witnesses.

HUMBERT CANTONI.
JEAN CHAUTEMS.
EMILE DEGRANGE.

Witnesses:
RODOLPHE DE WURSTEMBERG,
THÉODORE IMER.